US010895712B2

United States Patent
Kobayashi

(10) Patent No.: US 10,895,712 B2
(45) Date of Patent: Jan. 19, 2021

(54) OPTICAL DEVICE AND IMAGING APPARATUS WITH POSITION SENSORS AND COIL MOTORS

(71) Applicant: FUJIFILM Corporation, Tokyo (JP)

(72) Inventor: Hideo Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 216 days.

(21) Appl. No.: 16/170,072

(22) Filed: Oct. 25, 2018

(65) Prior Publication Data

US 2019/0064475 A1  Feb. 28, 2019

Related U.S. Application Data

(63) Continuation of application No. PCT/JP2017/014509, filed on Apr. 7, 2017.

(30) Foreign Application Priority Data

Apr. 28, 2016  (JP) .................................. 2016-090134

(51) Int. Cl.
*G02B 27/64* (2006.01)
*G02B 7/04* (2006.01)
(Continued)

(52) U.S. Cl.
CPC ................. *G02B 7/04* (2013.01); *G02B 7/08* (2013.01); *G02B 27/646* (2013.01); *G03B 3/10* (2013.01);
(Continued)

(58) Field of Classification Search
CPC ........ G02B 27/64; G02B 27/646; G02B 9/60; H04N 5/23248; H04N 5/23264;
(Continued)

(56) References Cited

U.S. PATENT DOCUMENTS

| 7,154,682 | B2* | 12/2006 | Umezu | G02B 15/00 359/740 |
| 7,443,422 | B2* | 10/2008 | Usui | G03B 5/00 348/208.11 |
| 8,159,746 | B2* | 4/2012 | Suzuki | G02B 27/646 359/557 |
| 8,582,205 | B2* | 11/2013 | Hasegawa | G02B 27/646 359/557 |

(Continued)

FOREIGN PATENT DOCUMENTS

| CN | 1773320 | 5/2006 |
| CN | 200972529 | 11/2007 |

(Continued)

OTHER PUBLICATIONS

"Written Opinion of the International Searching Authority (Form PCT/ISA/237) of PCT/JP2017/014509," dated Jun. 27, 2017, with English translation thereof, pp. 1-7.

(Continued)

*Primary Examiner* — Arnel C Lavarias
(74) *Attorney, Agent, or Firm* — JCIPRNET

(57) ABSTRACT

In a state in which a position sensor for focusing is viewed in the direction of an optical axis, a line connecting the position sensor for focusing to the optical axis is set as a first reference line and a line orthogonal to the first reference line and passing through the optical axis is set as a second reference line. The position sensor for focusing is disposed in a first region of the first region and a second region partitioned by the second reference line. An X-direction VCM and a Y-direction VCM are arranged in the second region. The influence of magnetism from the X-direction VCM and the Y-direction VCM on the position sensor for focusing is suppressed.

14 Claims, 7 Drawing Sheets

(51) Int. Cl.
  *G02B 7/08* (2006.01)
  *H02K 41/035* (2006.01)
  *H04N 5/225* (2006.01)
  *G03B 5/02* (2006.01)
  *G03B 3/10* (2006.01)
  *G03B 5/04* (2006.01)
  *G03B 13/34* (2006.01)
  *G03B 17/14* (2006.01)

(52) U.S. Cl.
  CPC .............. *G03B 5/02* (2013.01); *G03B 5/04* (2013.01); *G03B 13/34* (2013.01); *G03B 17/14* (2013.01); *H02K 41/0354* (2013.01); *H02K 41/0356* (2013.01); *H04N 5/2254* (2013.01); *G03B 2205/0015* (2013.01); *G03B 2205/0069* (2013.01); *G03B 2217/005* (2013.01)

(58) Field of Classification Search
  CPC ............ H04N 5/2328; H04N 5/23287; G03B 17/565; G03B 2217/005
  USPC .......... 359/554, 557, 763; 250/201.1, 201.2, 250/201.4; 348/208.99, 208.2, 208.12; 396/52, 55, 529, 530, 544
  See application file for complete search history.

(56) References Cited

U.S. PATENT DOCUMENTS

| 10,241,349 | B2 * | 3/2019 | Izumi ................... G02B 7/021 |
| 2010/0067889 | A1 | 3/2010 | Suzuki |
| 2010/0220402 | A1 | 9/2010 | Santo et al. |
| 2012/0262595 | A1 | 10/2012 | Kishida et al. |

FOREIGN PATENT DOCUMENTS

| CN | 101676788 | 3/2010 |
| CN | 103123432 | 5/2013 |
| CN | 204761268 | 11/2015 |
| CN | 204883014 | 12/2015 |
| JP | 2010072062 | 4/2010 |
| JP | 2011242791 | 12/2011 |
| JP | 5292334 | 9/2013 |
| JP | 2014056031 | 3/2014 |

OTHER PUBLICATIONS

"International Search Report (Form PCT/ISA/210) of PCT/JP2017/014509," dated Jun. 27, 2017, with English translation thereof, pp. 1-3.

"Office Action of China Counterpart Application", dated Jul. 1, 2020, with English translation thereof, p. 1-p. 22.

* cited by examiner

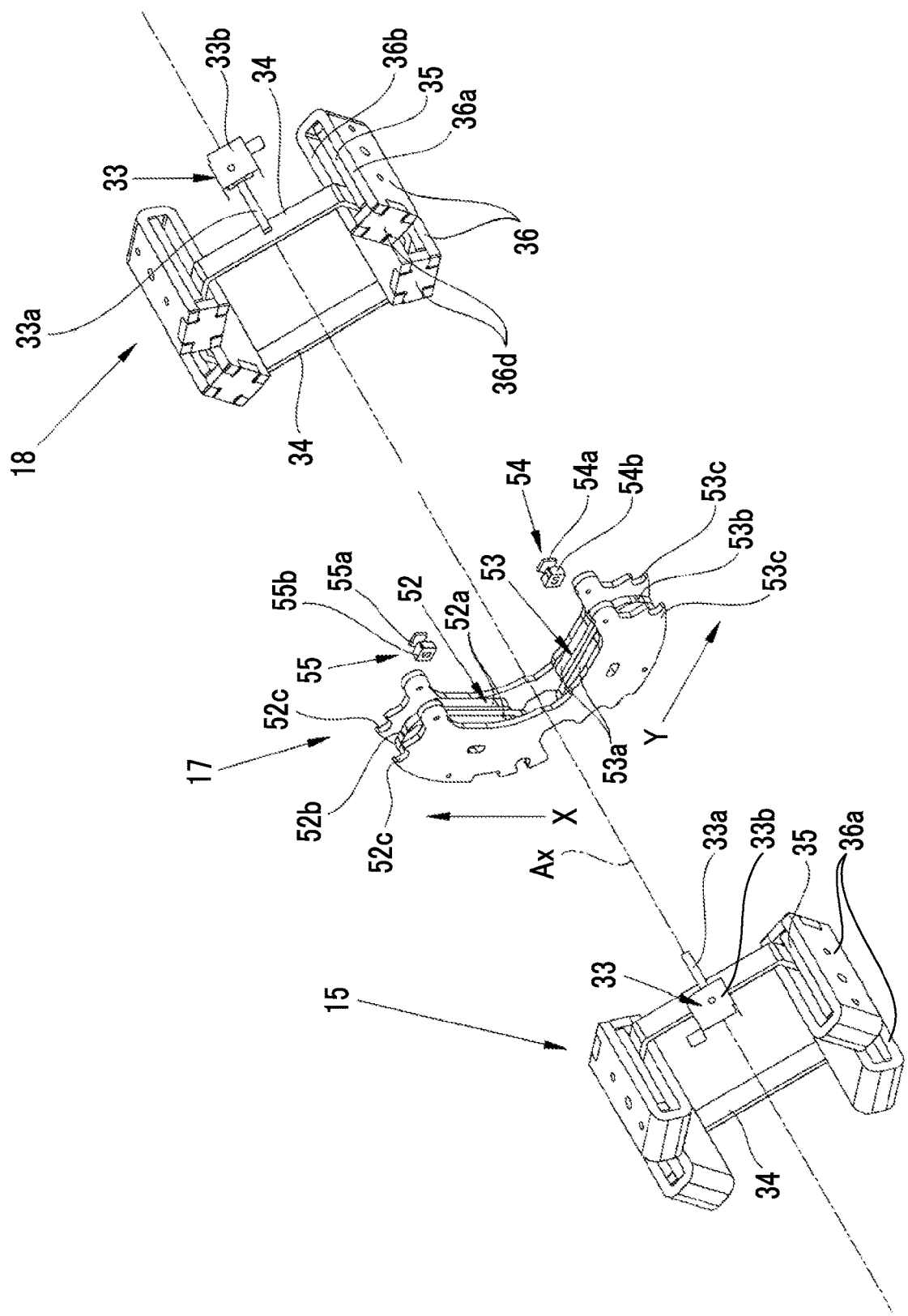

OPTICAL DEVICE AND IMAGING APPARATUS WITH POSITION SENSORS AND COIL MOTORS

CROSS-REFERENCE TO RELATED APPLICATIONS

This application is a Continuation of PCT International Application No. PCT/JP2017/014509 filed on 7 Apr. 2017, which claims priority under 35 U.S.C § 119(a) to Japanese Patent Application No. 2016-090134 filed on 28 Apr. 2016. The above application is hereby expressly incorporated by reference, in its entirety, into the present application.

BACKGROUND OF THE INVENTION

1. Field of the Invention

The present invention relates to an optical device and an imaging apparatus.

2. Description of the Related Art

In an imaging apparatus, such as a digital camera, or an optical device, such as a lens barrel, there is a high demand for a reduction in size and the improvement of the speed of auto-focusing is also required. For this reason, a focusing system is formed of a plurality of focus lens groups to make a stroke length shorter than a stroke length that is obtained in a case in which a focusing system is formed of a single focus lens group (for example, JP2011-242791A (corresponding to US2012/0262595A1)). Accordingly, the entire length of the lens barrel can be reduced, and the speed of auto-focusing can be improved. Further, the performance degradation of a macro region can also be reduced in a macro lens.

Incidentally, there are many cases where an imaging apparatus, such as a digital camera, or an optical device, such as a lens barrel, is provided with a vibration-proof mechanism. The vibration-proof mechanism includes a vibration-proof lens and actuators, and the actuators shift the vibration-proof lens in a pitch direction and a yaw direction. Accordingly, image blur caused by shake is suppressed (for example, JP2010-072062A (corresponding to US2010/0067889A1)). A linear actuator (voice coil motor), which includes a coil and magnets, is used as the actuator for shifting the vibration-proof lens.

Further, there is a case where a voice coil motor is used as an actuator for moving a movable lens, such as a focus lens group, other than a rotary motor. Furthermore, such an optical device is provided with light-amount control members, such as a stop, a neutral density (ND) filter, and a shutter, and actuators that drive these light-amount control members.

In the optical device disclosed in JP2010-072062A, first and second actuators shifting the vibration-proof lens in directions different from each other, a third actuator moving the movable lens and including magnets and a coil, and a fourth actuator operating the light-amount control members and including magnets and a coil are received in a lens barrel member, and these actuators are arranged not to overlap with each other in a state in which these actuators are viewed in the direction of an optical axis. Accordingly, magnetic interference between the actuators of the optical device is suppressed.

SUMMARY OF THE INVENTION

However, in a case in which all of the first to fourth actuators are arranged not to overlap with each other as in the optical device disclosed in JP2010-072062A in a state in which the first to fourth actuators are viewed in the direction of the optical axis, magnetic interference caused by the respective actuators can be suppressed but it is difficult to achieve efficient arrangement that can contribute to a reduction in size.

In a case in which a focusing system is formed of a plurality of focus lens groups from the beginning to reduce the entire length of the lens barrel and to improve the speed of auto-focusing, magnetic interference between the voice coil motors of the vibration-proof mechanism and the position sensors needs to be considered other than magnetic interference between voice coil motors as actuators, which move the respective focus lens groups, and position sensors that detect the positions of the respective focus lens groups to be moved by these voice coil motors. Accordingly, in a case in which the respective actuators are arranged not to overlap with each other in a state in which the respective actuators are viewed in the direction of the optical axis, magnetic interference cannot be efficiently suppressed and the respective parts cannot be accurately operated.

An object of the invention is to provide an optical device and an imaging apparatus that can much more mitigate magnetic interference between actuators in a dual-focus type optical device individually moving first and second focus lenses.

An optical device according to an aspect of the invention includes a first focus lens frame, a second focus lens frame, a blur-correction lens frame, first to fourth voice coil motors, and first to fourth position sensors. The first focus lens frame holds a first focus lens for focusing a subject image and is moved in a direction of an optical axis of the first focus lens. The second focus lens frame is disposed so as to be spaced from the first focus lens in the direction of the optical axis, holds a second focus lens for focusing the subject image, and is moved in the direction of the optical axis. The blur-correction lens frame holds a blur-correction lens disposed between the first focus lens and the second focus lens and is moved in a direction orthogonal to the optical axis of the first focus lens. The first voice coil motor includes a first drive magnet, a first yoke, and a first coil mounted on the first lens frame and moves the first lens frame in the direction of the optical axis in a case in which current flows in the first coil. The second voice coil motor includes a second drive magnet, a second yoke, and a second coil mounted on the second lens frame and moves the second lens frame in the direction of the optical axis in a case in which current flows in the second coil. The third voice coil motor includes a third drive magnet, a third yoke, and a third coil mounted on the blur-correction lens frame and moves the blur-correction lens frame in a first direction in a plane orthogonal to the optical axis in a case in which current flows in the third coil. The fourth voice coil motor includes a fourth drive magnet, a fourth yoke, and a fourth coil mounted on the blur-correction lens frame and moves the blur-correction lens frame in a second direction orthogonal to the first direction in a plane orthogonal to the optical axis in a case in which current flows in the fourth coil. The first position sensor magnetically detects a position of the first lens frame in the direction of the optical axis. The second position sensor magnetically detects a position of the second lens frame in the direction of the optical axis. The third position sensor magnetically detects a position of the blur-correction lens frame in the first direction. The fourth position sensor magnetically detects a position of the blur-correction lens frame in the second direction. In a state in which the first position sensor, the second position sensor, the third voice coil motor, and the fourth voice coil motor are viewed in the direction of the optical axis, a line connecting the first position sensor to the optical axis is set as a first reference line and a line orthogonal to the first reference line and passing through the optical axis is set as a second reference line. The first position sensor and the second position sensor are arranged in a first region of the first region and a second region partitioned by the second reference line. The third drive magnet and the third yoke of the third voice coil motor and the fourth drive magnet and the fourth yoke of the fourth voice coil motor are arranged in the second region.

It is preferable that the third position sensor and the fourth position sensor are arranged so as to be symmetric with respect to the first reference line. In this case, the deviation of the influence of the magnetism from the first and second voice coil motors on the third and fourth position sensors can be prevented, and vibration-proof performance can be improved. It is preferable that the first position sensor and the second position sensor are arranged so as to overlap with each other in a state in which the first position sensor and the second position sensor are viewed in the direction of the optical axis. In this case, the influence of magnetism can be efficiently suppressed. Further, it is preferable that the third voice coil motor and the fourth voice coil motor are arranged so as to be symmetric with respect to the first reference line in a state in which the third voice coil motor and the fourth voice coil motor are viewed in the direction of the optical axis. Even in this case, since the first position sensor and the second position sensor are spaced so as to be equidistant from the third voice coil motor and the fourth voice coil motor, the influence of the magnetism of the third voice coil motor and the fourth voice coil motor can be suppressed so as to be more uniform.

It is preferable that each of the first position sensor and the second position sensor includes a first sensor magnet and a first magnetic sensor magnetically detecting a change in a position of the first sensor magnet, each of the third position sensor and the fourth position sensor includes a second sensor magnet and a second magnetic sensor magnetically detecting a change in a position of the second sensor magnet, the second magnetic sensor is a Hall element, and the first magnetic sensor is a magnetic sensor detecting magnetism weaker than magnetism to be detected by the Hall element. In this case, since the first and second position sensors, which include the first magnetic sensors detecting magnetism weaker than magnetism to be detected by a Hall element, can be spaced from the magnets and the yokes of the third and fourth voice coil motors on which the influence of magnetism is greatest, the influence of the magnetism from the magnets and the yokes of the third and fourth voice coil motors can be efficiently suppressed.

It is preferable that the optical device further includes a pair of first guide members guiding the first lens frame in the direction of the optical axis and guide member-sliding portions which are formed on the first lens frame and on which the first guide members slide. The pair of first guide members is disposed on the first reference line with the optical axis interposed therebetween. The first coil is disposed on an outer periphery of the first focus lens. A plurality of the first drive magnets and a plurality of the first yokes are provided, and the plurality of first drive magnets and the plurality of first yokes are arranged so as to be symmetric with respect to the first reference line. Further, the second coil is disposed on an outer periphery of the second focus lens. A plurality of the second drive magnets and a plurality of the second yokes are provided, and the plurality of second drive magnets and the plurality of second yokes are arranged so as to be symmetric with respect to the first reference line. In this case, since the pair of second guide members is disposed for one coil on the first reference line with the optical axis interposed therebetween and the magnets and the yokes are arranged so as to be symmetric with respect to the first reference line, the coil, the magnets, and the yokes are arranged at symmetric positions in balance. Accordingly, the first voice coil motor and the second voice coil motor can be smoothly operated.

It is preferable that the number of each of the first drive magnets, the first yokes, the second drive magnets, and the second yokes is four and the respective magnets and the respective yokes are arranged so as to be symmetric with respect to the second reference line. Further, it is preferable that the first coil and the second coil are formed in a hexagonal shape in a state in which the first coil and the second coil are viewed in the direction of the optical axis. Since the above-mentioned arrangement is made, the respective members are arranged in balance. Accordingly, the first voice coil motor and the second voice coil motor can be more smoothly operated.

It is preferable that the first and second drive magnets of the first and second voice coil motors have the same shape, the first and second yokes of the first and second voice coil motors have the same shape, and the first and second coils of the first and second voice coil motors have the same shape. Further, it is preferable that a moving distance of the first focus lens in the direction of the optical axis is equal to a moving distance of the second focus lens in the direction of the optical axis. Furthermore, it is preferable that the moving distance of the first focus lens in the direction of the optical axis is equal to the moving distance of the second focus lens in the direction of the optical axis and a weight of the first focus lens is equal to a weight of the second focus lens. Since these are formed to have the same structure, not only the number of types of components is reduced but also the first and second voice coil motors are easily synchronized with each other.

It is preferable that an imaging apparatus according to another aspect of the invention includes the optical device and an imaging element taking the subject image to be obtained through the optical device. Further, it is preferable that the optical device is included in an exchangeable lens unit including a connector that is attachable to and detachable from a camera body including the imaging element in the imaging apparatus according to another aspect of the invention.

According to the aspects of the invention, it is possible to much more mitigate magnetic interference between voice coil motors and magnetic sensors in a dual-focus type optical device individually moving first and second focus lenses by voice coil motors.

BRIEF DESCRIPTION OF THE DRAWINGS

FIG. 7 is a perspective view showing main portions of the first focus mechanism, the vibration-proof mechanism, and the second focus mechanism that are disassembled in the direction of the optical axis.

DESCRIPTION OF THE PREFERRED EMBODIMENTS

Figure 1:
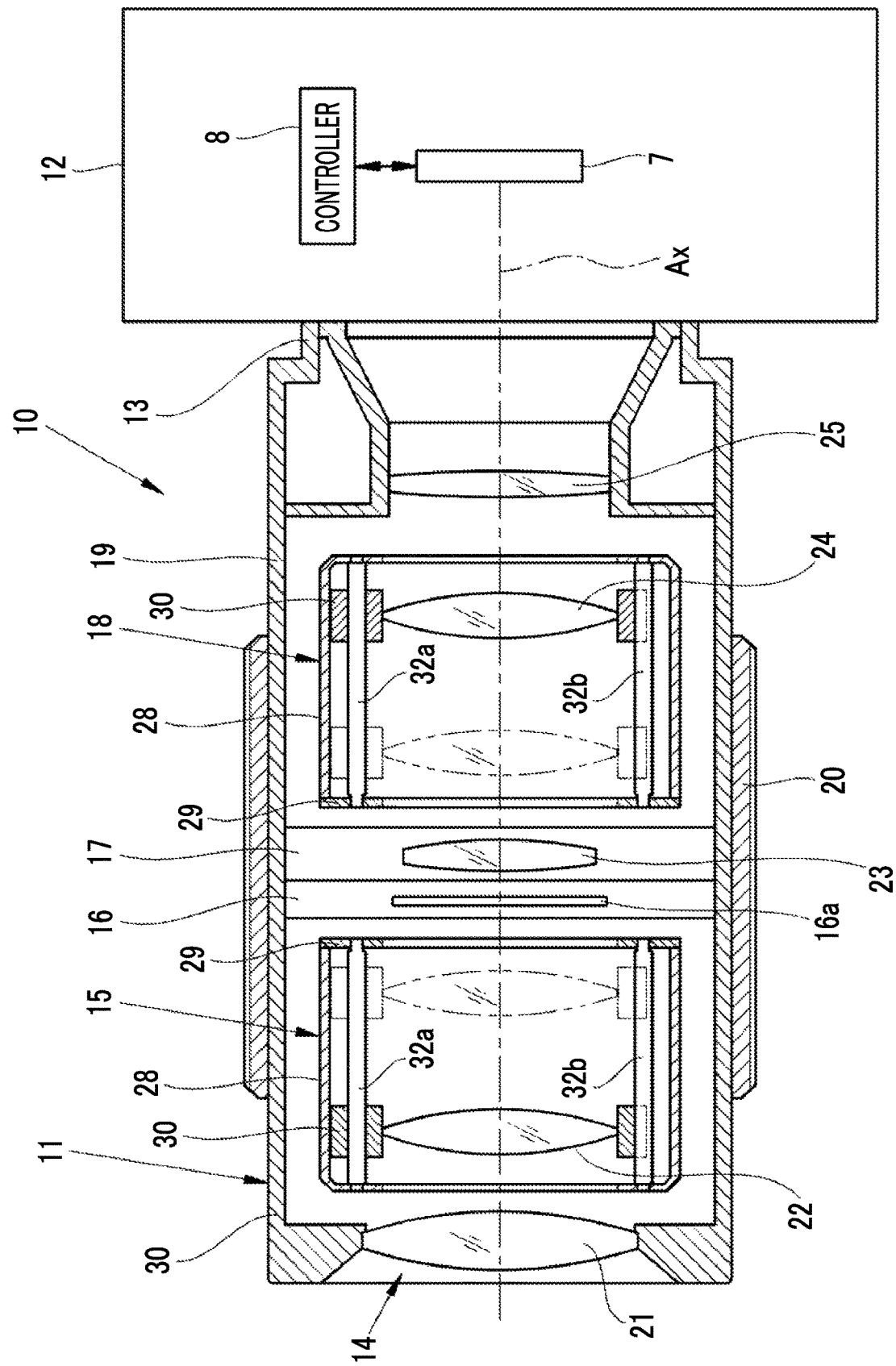
FIG. 1 is a cross-sectional view showing the schematic structure of an imaging apparatus according to an embodiment of the invention.

As shown in FIG. 1, an imaging apparatus 10 according to an embodiment of the invention includes a lens unit 11 as an optical device and a camera body 12. The lens unit 11 is formed as an exchangeable lens unit. The lens unit 11 includes a connector 13 that is attachable to and detachable from the camera body 12. The lens unit 11 may be formed integrally with the camera body 12.

The lens unit 11 comprises an optical system 14 in a lens barrel member 19. The optical system 14 includes a first lens 21, a second lens 22, a third lens 23, a fourth lens 24, and a fifth lens 25 that are arranged in this order from a subject side along an optical axis Ax. Each of the first to fifth lenses 21 to 25 is schematically shown as one lens, but may be a plurality of lens groups.

The camera body 12 comprises an imaging element 7 that takes an optical image of a subject obtained through the optical system 14. A controller 8 inputs information about various imaging conditions, such as an imaging timing, to the imaging element 7, and receives image signals that are taken by and output from the imaging element 7. Then, the controller 8 performs analog processing and digital processing on the received image signals and generates taken image data to be output.

Figure 2:
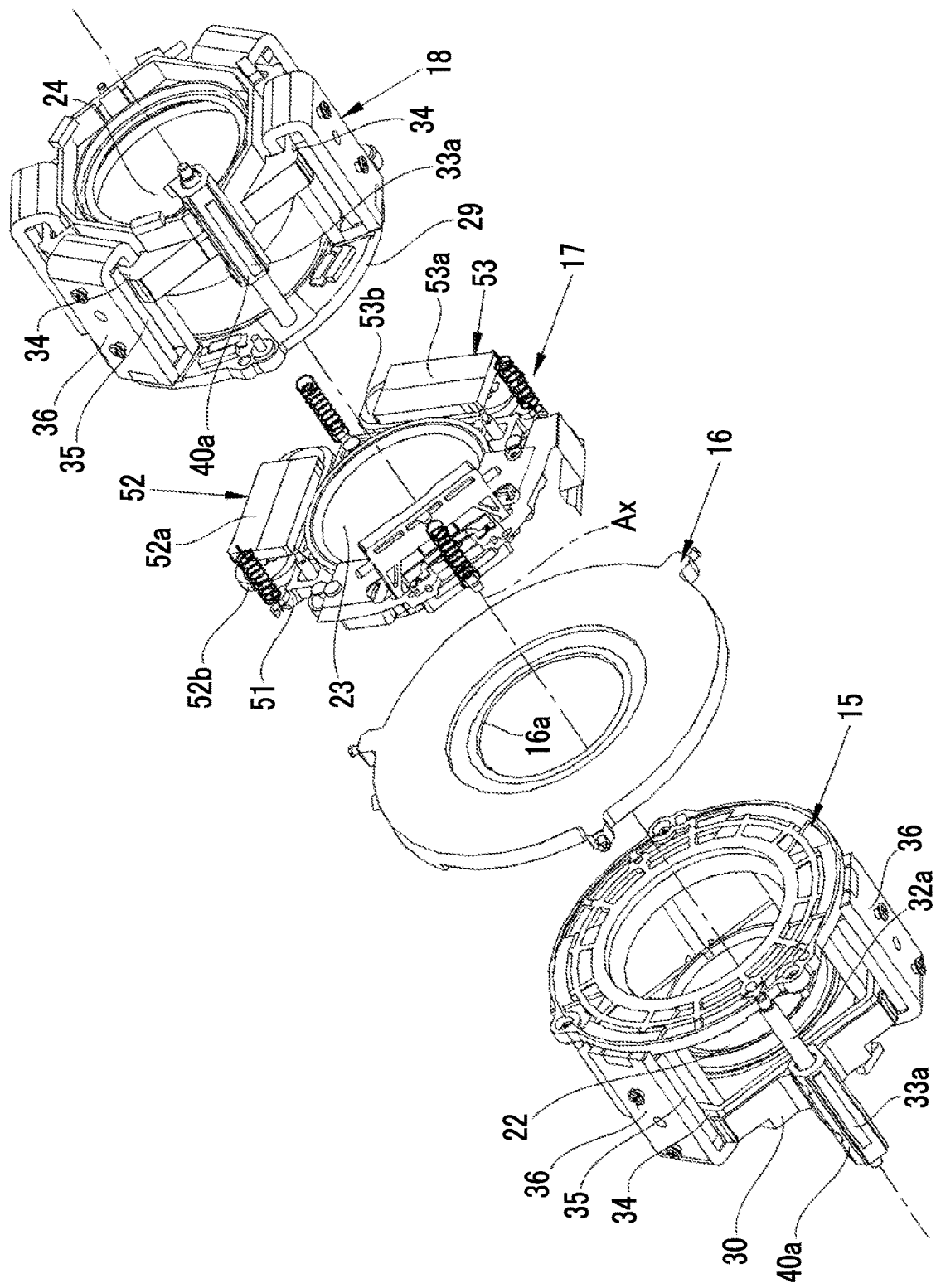
FIG. 2 is an exploded perspective view showing a first focus mechanism, a stop mechanism, a vibration-proof mechanism, and a second focus mechanism that are disassembled in the direction of an optical axis.

As also shown in FIG. 2, a first focus mechanism 15, a stop mechanism 16, a vibration-proof mechanism 17, and a second focus mechanism 18 are arranged in the lens barrel member 19 in this order from the subject side.

A focus ring 20 is rotatably mounted on the outer periphery of the lens barrel member 19. In a case in which manual focusing is to be performed, for example, a first focus lens 22 as the second lens 22 and a second focus lens 24 as the fourth lens 24 are individually moved in the direction of the optical axis Ax (hereinafter, the direction of the optical axis) according to the rotation of the focus ring 20 when the focus ring 20 is rotated. The first focus lens 22 and the second focus lens 24 are arranged at predetermined positions corresponding to an imaging distance in the direction of the optical axis by the movement of the first focus lens 22 and the second focus lens 24, and can perform focusing.

The first lens 21 and the fifth lens 25 are stationary lenses, and are fixed on the front end side (subject side) and rear end side (imaging element 7 side) of the lens barrel member 19, respectively. The first focus lens 22 as the second lens 22, a blur-correction lens 23 as the third lens 23, and the second focus lens 24 as the fourth lens 24 are movable lenses.

The first focus lens 22 is driven by the first focus mechanism 15 and is moved in the direction of the optical axis. The second focus lens 24 is driven by the second focus mechanism 18 and is moved in the direction of the optical axis.

Figure 3:
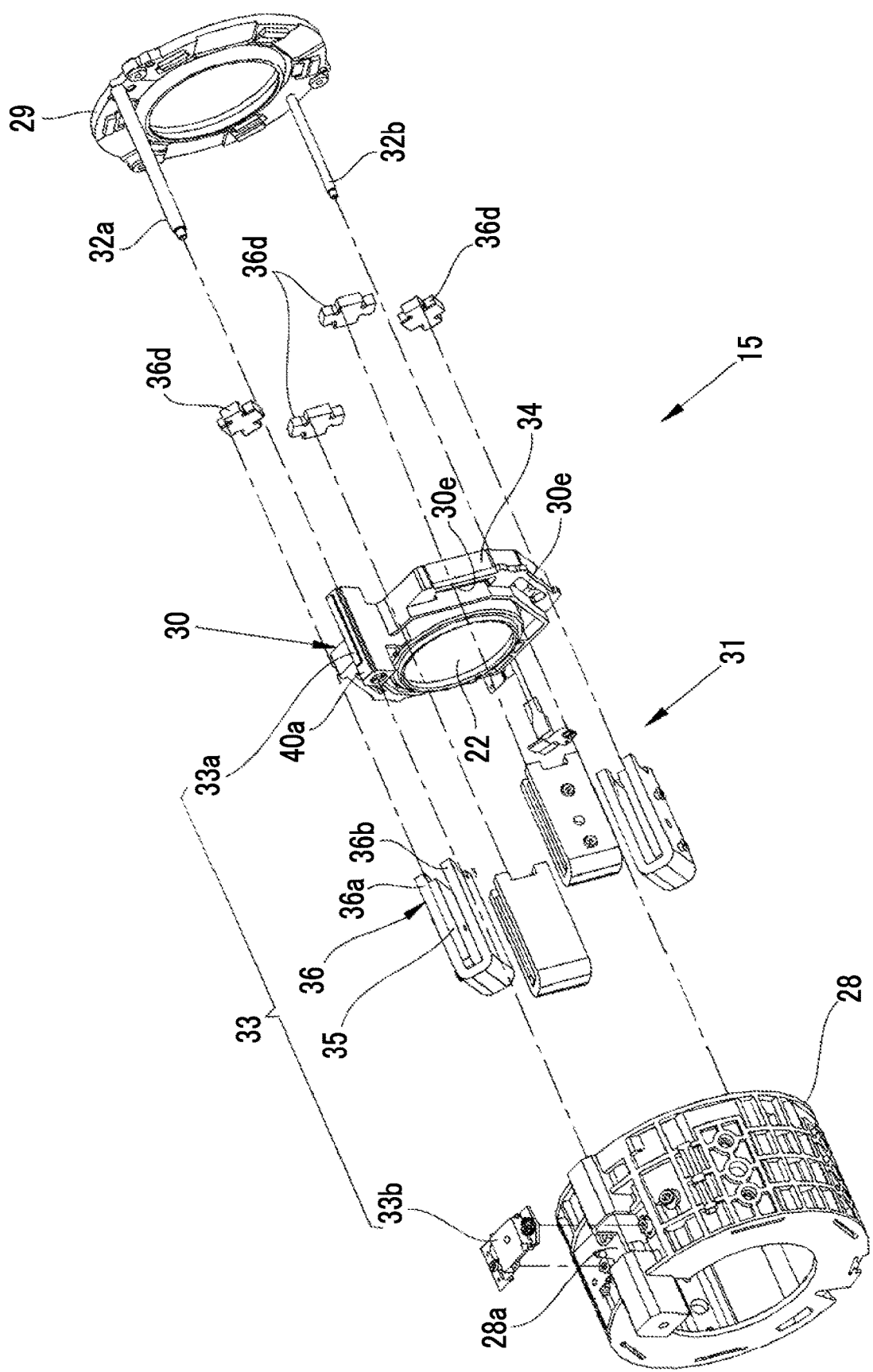
FIG. 3 is a perspective view showing a state in which the first focus mechanism is disassembled in the direction of the optical axis and is viewed from the front side.
Figure 4:
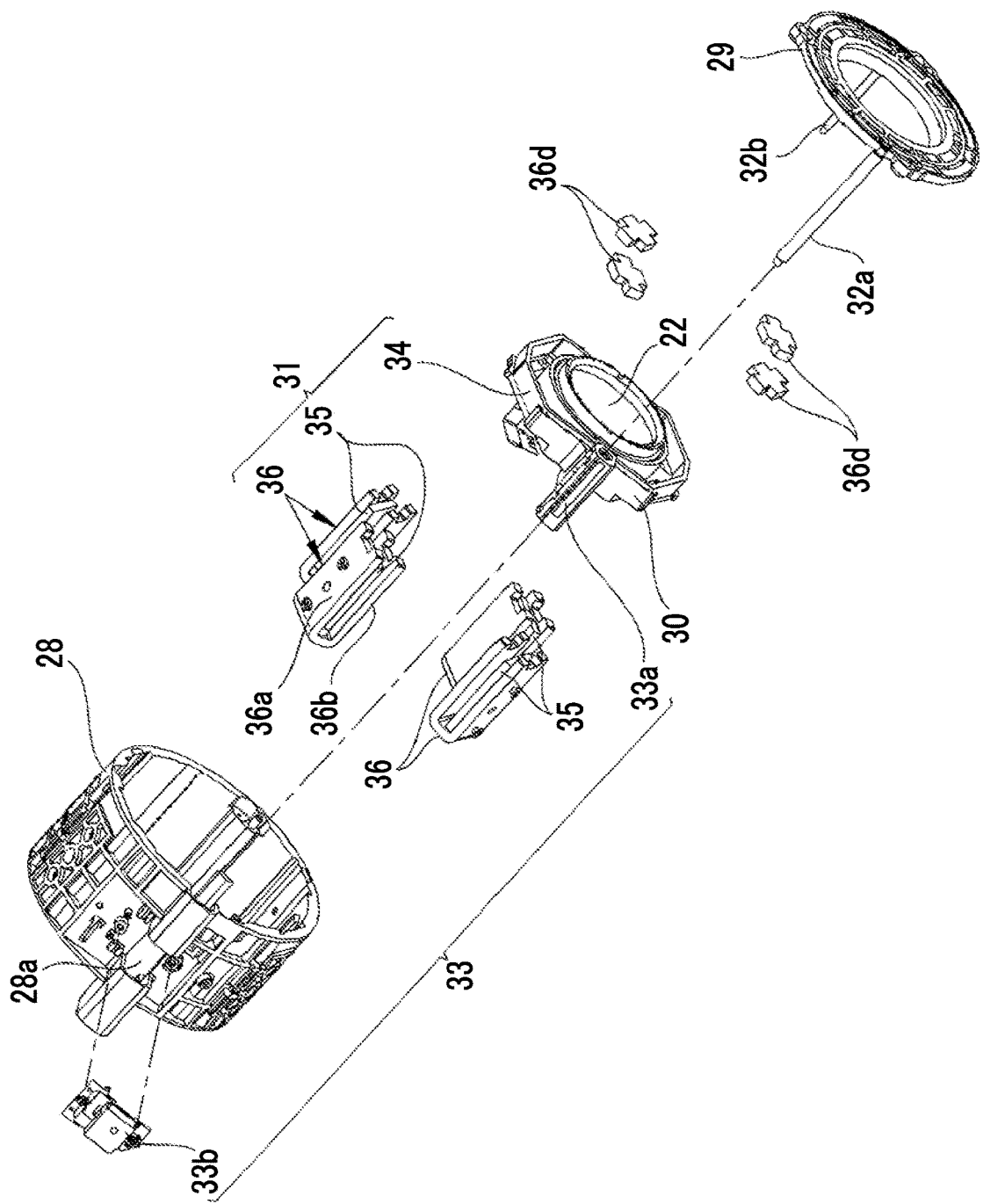
FIG. 4 is a perspective view showing a state in which the first focus mechanism is disassembled in the direction of the optical axis and is viewed from the rear side.

As shown in FIGS. 3 and 4, the first focus mechanism 15 includes a focus lens frame 30 (corresponding to a first lens frame), a voice coil motor 31 for focusing (hereinafter, referred to as a VCM, corresponding to a first VCM), a pair of guide rods 32a and 32b as first guide members, a position sensor 33 for focusing as a first position sensor, and a base plate 29 in a cylindrical focus barrel 28. The focus lens frame 30 holds the first focus lens 22. The focus lens frame 30 is held by the pair of guide rods 32a and 32b so as to be movable in the direction of the optical axis. The guide rods 32a and 32b are arranged so as to protrude from the base plate 29 in a direction parallel to the optical axis Ax. The pair of guide rods 32a and 32b is arranged so as to be spaced from the optical axis Ax as a center in a diameter direction of the base plate 29 orthogonal to the optical axis Ax.

The VCM 31 for focusing comprises one coil 34 (corresponding to a first coil), four drive magnets 35 (corresponding to a first drive magnet), and four yokes 36 (corresponding to a first yoke), and moves the focus lens frame 30 in the direction of the optical axis in a case in which current flows in the coil 34.

The coil 34 is an air-core coil that is formed by winding a copper wire or the like. The coil 34 is mounted on the focus lens frame 30 at a position outside the first focus lens 22.

Figure 5:
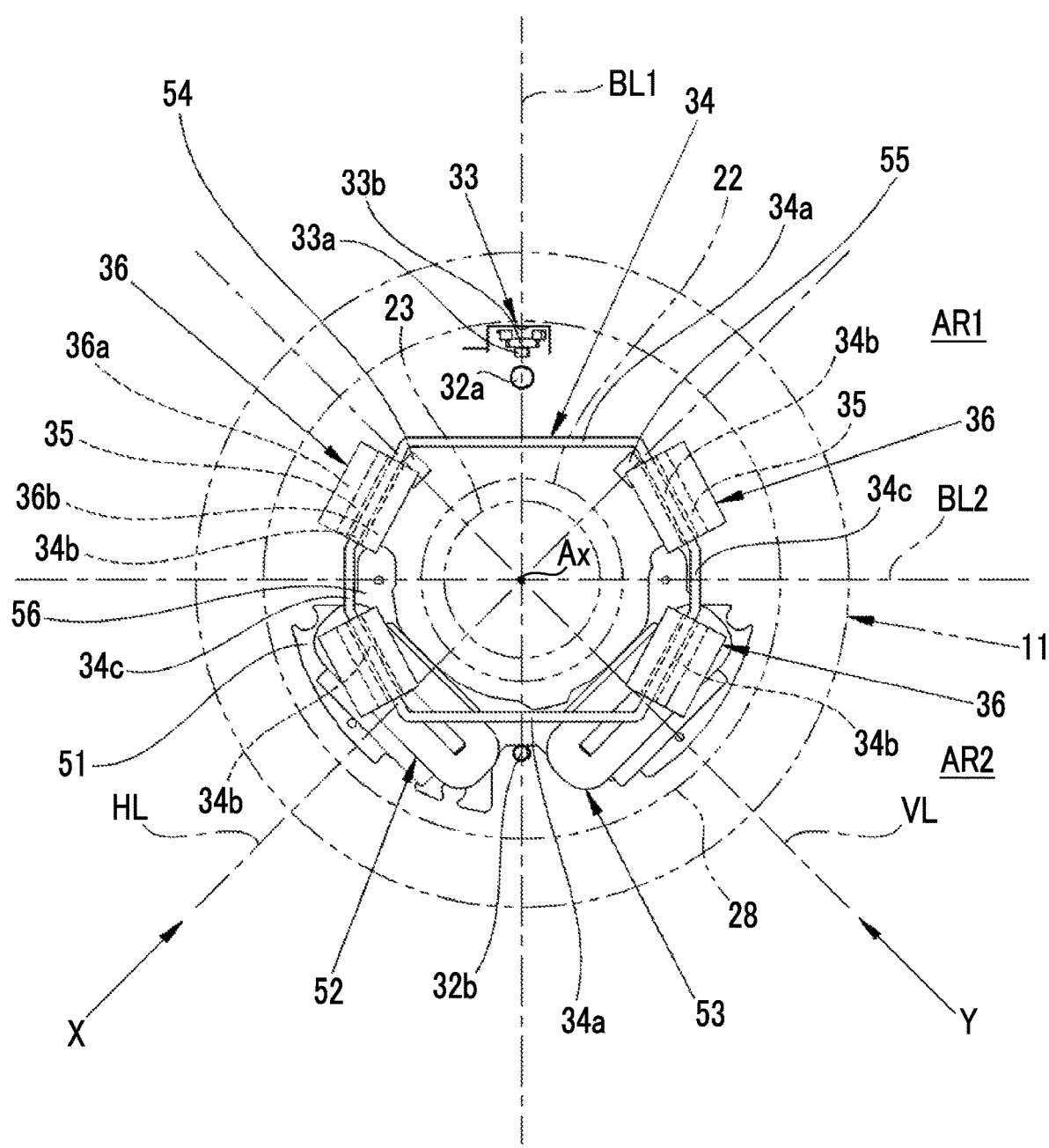
FIG. 5 is a front view of main portions of the first focus mechanism and the vibration-proof mechanism that are viewed in the direction of the optical axis.

As shown in FIG. 5, the coil 34 is formed in a hexagonal shape in a state in which the coil 34 is viewed in the direction of the optical axis. The coil 34 is formed in a substantially hexagonal shape which is vertically long and of which a pair of opposite sides is formed of long sides 34a longer than the other four sides and the other four sides are formed of short sides 34b. Further, since apex angle portions where the short sides 34b are connected to each other are subjected to chamfering and connecting sides 34c formed by the chamfering are also included in the coil 34, the coil 34 is formed exactly in an octagonal shape. The octagonal shape, which is formed by the chamfering of the apex angle portions as described above, is also a substantially hexagonal shape and is included in a hexagonal shape in the invention.

Figure 6:
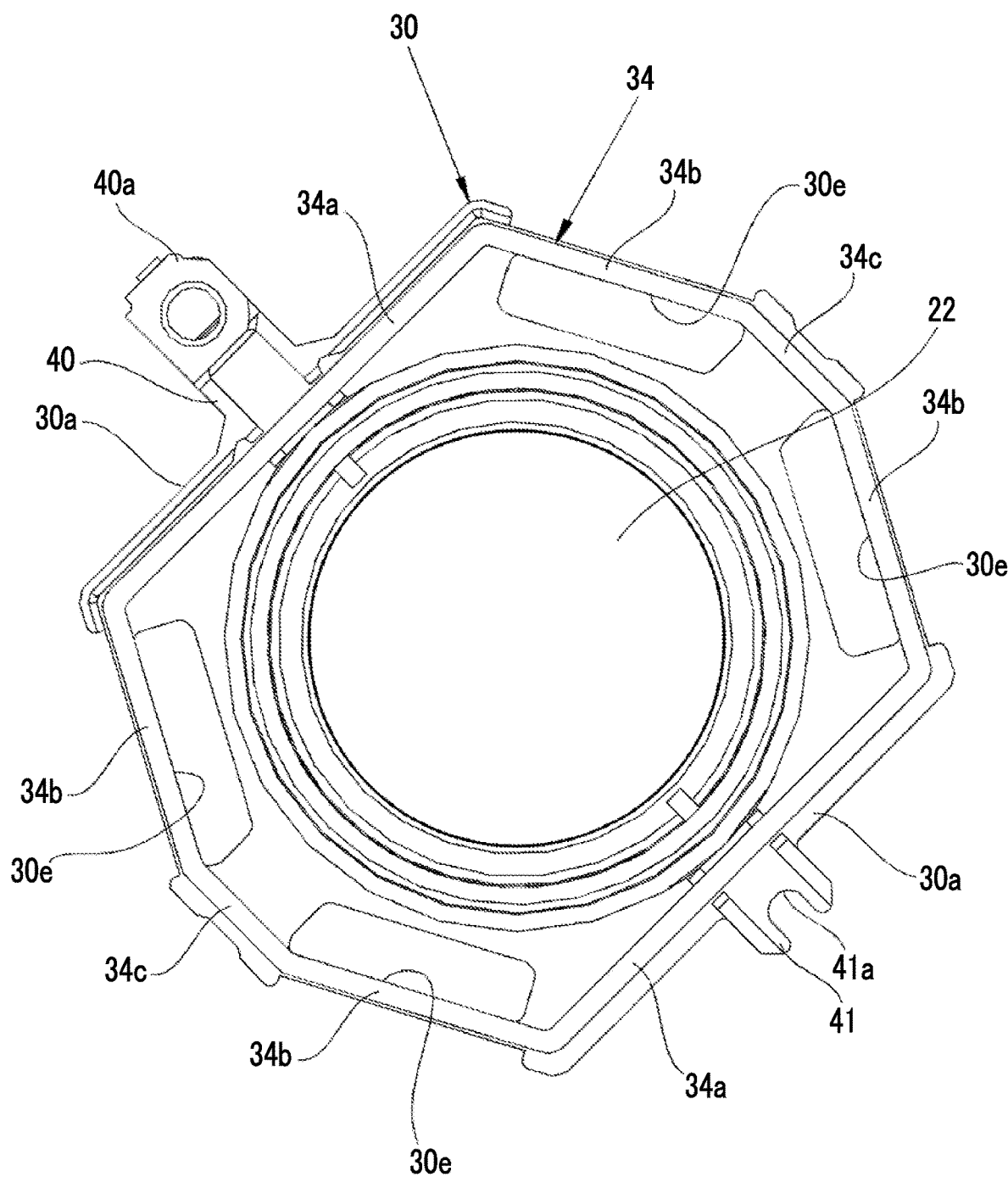
FIG. 6 is a back view of a focus lens frame that is viewed in the direction of the optical axis.

As shown in FIG. 6, the outer shape of the focus lens frame 30 is also formed of a substantially hexagonal shape as in the case of the coil 34 in a state in which the focus lens frame 30 is viewed in the direction of the optical axis. Further, sliding portions 40 and 41 (corresponding to guide member-sliding portions) are formed in the middle portions of the pair of long sides 30a in a circumferential direction so as to protrude in the diameter direction passing through the optical axis Ax. A sliding cylinder 40a is formed at the distal end of one sliding portion 40, and a sliding groove 41a is formed at the distal end of the other sliding portion 41.

As shown in FIG. 3, the sliding cylinder 40a is formed parallel with the direction of the optical axis. One guide rod 32a is inserted into the sliding cylinder 40a. Further, the guide rod 32b is engaged with the sliding groove 41a. Since the pair of guide rods 32a and 32b is engaged with the sliding cylinder 40a and the sliding groove 41a, the focus lens frame 30 is moved and guided in the direction of the optical axis.

As shown in FIGS. 3 and 4, each yoke 36 is formed of a magnetic body and is formed in a U shape where an outer yoke 36a and an inner yoke 36b face each other so as to clamp the coil 34 and each drive magnet 35. The drive magnet 35 is mounted on the inner surface of each outer yoke 36a.

Openings 30e (see FIG. 6) into which the inner yokes 36b are to be inserted are formed at the focus lens frame 30. After the inner yokes 36b are inserted into the openings 30e, connecting plates 36d are fitted to notches of the outer and inner yokes 36a and 36b. Accordingly, the drive magnet 35 and the yoke 36 are arranged at each of the four short sides 34b of the coil 34 as shown in FIG. 5.

The yokes 36 are fixed to the inner peripheral surface of the focus barrel 28. The coil 34 is disposed between the yokes 36 and the drive magnets 35, and is moved in the direction of the optical axis in a magnetic field that is generated by the drive magnets 35 in a case in which current flows in the coil 34.

The position sensor 33 for focusing detects the position of the focus lens frame 30 in the direction of the optical axis. The position sensor 33 for focusing includes a rod-like position-detection magnet 33a (corresponding to a first sensor magnet) and a magnetic sensor 33b (corresponding to a first magnetic sensor). The position-detection magnet 33a is embedded in the outer surface of the sliding cylinder 40a of the focus lens frame 30, and the surface of the position-detection magnet 33a is exposed to the outside.

A GMR element using a giant magneto resistive effect (GMR) is used as the magnetic sensor 33b. The magnetic sensor 33b is mounted on the outside of the focus barrel 28. An opening 28a (see FIGS. 3 and 4), which allows the position-detection magnet 33a to be exposed to the outside of the focus barrel 28, is formed at the focus barrel 28. The magnetic sensor 33b is disposed close to the position-detection magnet 33a through the opening 28a. Accordingly, the magnetic sensor 33b detects the magnetism of the position-detection magnet 33a and outputs a detection signal corresponding to the strength of the magnetism.

An output signal of the magnetic sensor 33b is sent to the controller 8 of the camera body 12. The controller 8 detects the position of the focus lens frame 30 in the direction of the optical axis on the basis of the output signal of the magnetic sensor 33b, and moves the first focus lens 22 to a desired position by the first focus mechanism 15 to perform focusing.

In this embodiment, as shown in FIG. 5, guide positions where the focus lens frame 30 is to be guided by the guide rods 32a and 32b, and the positions where a magnetic force is to be applied to the focus lens frame 30 in a case in which current flows in the coil 34 are positioned on concentric circles having a center on the optical axis Ax. For this reason, the guide rods 32a and 32b, the drive magnets 35, and the yokes 36 are arranged around the optical axis Ax in balance. Accordingly, the focus lens frame 30 can be smoothly moved in the direction of the optical axis in a case in which current flows in the coil 34.

As shown in FIG. 2, the second focus mechanism 18 comprises a focus lens frame 30 (corresponding to a second lens frame), a VCM 31 for focusing (corresponding to a second VCM), a pair of guide rods 32a and 32b (second guide members), and a position sensor 33 for focusing (a second position sensor for focusing) in a cylindrical focus barrel 28 (see FIG. 1). The second focus mechanism 18 has the same structure as the first focus mechanism 15 except that the second focus lens 24 is mounted on the focus lens frame 30 instead of the first focus lens 22. For this reason, the same components are denoted by the same reference numerals and the repeated description thereof will be omitted.

In a case in which the respective components need to be identified between the first focus mechanism 15 and the second focus mechanism 18, "first" is added to the components of the first focus mechanism 15 and "second" is added to the components of the second focus mechanism 18. A direction in which the second focus mechanism 18 is mounted and a direction in which the first focus mechanism 15 is mounted are opposite to each other in a front-rear direction, but may be the same direction. As shown in FIG. 7, the first focus mechanism 15 and the second focus mechanism 18 are arranged so that the first position sensor 33 for focusing and the second position sensor 33 for focusing (corresponding to a second position sensor) overlap with each other in a state in which the first position sensor 33 for focusing and the second position sensor 33 for focusing are viewed in the direction of the optical axis.

As shown in FIG. 2, the stop mechanism 16 and the vibration-proof mechanism 17 are mounted between the first focus mechanism 15 and the second focus mechanism 18. The stop mechanism 16 includes a stop leaf blade 16a that is disposed around the optical axis Ax. The amount of imaging light, which is to be incident on the camera body 12, is adjusted by an increase and reduction in the diameter of a stop opening that is formed by the stop leaf blade 16a.

The vibration-proof mechanism 17 includes a blur-correction lens 23, a blur-correction lens frame 51, an X-direction VCM 52 (corresponding to a third VCM), a Y-direction VCM 53 (corresponding to a fourth VCM), an X-direction position sensor 54 (corresponding to a third position sensor, see FIG. 7), a Y-direction position sensor 55 (corresponding to a fourth position sensor, see FIG. 7), and a fixed plate 56 (see FIG. 5). The blur-correction lens frame 51 holds the blur-correction lens 23, and is mounted on the fixed plate 56 so as to be movable in an X direction (corresponding to a first direction, see FIG. 7) and a Y direction (corresponding to a second direction, see FIG. 7).

The X-direction VCM 52 includes drive magnets 52a (corresponding to a third drive magnet), a coil 52b (corresponding to a third coil), and yokes 52c (corresponding to a third yoke), and moves the blur-correction lens frame 51 in the X direction. The drive magnets 52a are fixed to the yokes 52c, and the yokes 52c are fixed to the fixed plate 56. The coil 52b is fixed to the blur-correction lens frame 51. The Y-direction VCM 53 includes drive magnets 53a (corresponding to a fourth drive magnet), a coil 53b (corresponding to a fourth coil), and yokes 53c (corresponding to a fourth yoke), and moves the blur-correction lens frame 51 in the Y direction. The drive magnets 53a are fixed to the yokes 53c, and the yokes 53c are fixed to the fixed plate 56. Further, the coil 53b is fixed to the blur-correction lens frame 51.

The X-direction position sensor 54 detects the position of the lens of the blur-correction lens frame 51 in the X direction, and the Y-direction position sensor 55 detects the position of the lens of the blur-correction lens frame 51 in the Y direction. The X-direction position sensor 54 includes a position-detection magnet 54a (corresponding to a second sensor magnet) and a magnetic sensor 54b (corresponding to a second magnetic sensor). Likewise, the Y-direction position sensor 55 also includes a position-detection magnet 55a (corresponding to a second sensor magnet) and a magnetic sensor 55b (corresponding to a second magnetic sensor).

A Hall element is used as each of the magnetic sensors 54b and 55b. The magnetic sensors 54b and 55b are fixed to, for example, the fixed plate 56. Further, the position-detection magnets 54a and 55a are fixed to the blur-correction lens frame 51. The magnetic sensors 54b and 55b are arranged close to the position-detection magnets 54a and 55a, respectively. Accordingly, the magnetic sensors 54b and 55b detect the magnetism of the position-detection magnets 54a and 55a, and outputs detection signals corresponding to the strength of the magnetism. The detection signals are sent to the controller 8. In a case in which the movement of the imaging apparatus 10 is detected by a vibration gyro sensor (not shown), the controller 8 corrects image blur by displacing the blur-correction lens 23 in an XY plane using the X-direction VCM 52 and the Y-direction VCM 53 in a direction where image blur caused by this movement is to be canceled.

Next, the action of this embodiment will be described. In a case in which imaging is started by a release operation, the first and second focus mechanisms 15 and 18 are operated and the first and second focus lenses 22 and 24 are moved in the direction of the optical axis, and focusing control is performed. In a case in which the focusing control of a plurality of focus lenses 22 and 24 is performed by the first and second focus mechanisms 15 and 18 as described above, a lens-moving distance is dispersed. Accordingly, quick focusing can be performed. Particularly, since the plurality of focus lenses 22 and 24 are moved, quick and accurate focusing can be performed in macro imaging. Further, in a case in which the shake of the imaging apparatus 10 is detected, the vibration-proof mechanism 17 is operated and moves the blur-correction lens 23 in the XY plane. Accordingly, image blur is corrected.

As shown in FIGS. 1 and 2, the first focus mechanism 15, the stop mechanism 16, the vibration-proof mechanism 17, and the second focus mechanism 18 are arranged in this order in the lens barrel member 19 so as to be close to each other. For this reason, there is a concern that magnetic interference may occur in a case in which the VCMs 31, 52, and 53 as drive sources of the first focus mechanism 15, the vibration-proof mechanism 17, and the second focus mechanism 18 and the position sensors 33, 54, and 55 formed of magnetic sensors are not arranged at appropriate positions. Since the position sensors 33, 54, and 55 cannot accurately detect positions in a case in which magnetic interference occurs, malfunction occurs or abnormal noises are generated.

Particularly, since each of the first and second focus mechanisms 15 and 18 detects the position of the focus lens frame 30 by the position sensor 33 for focusing that uses a GMR element as the magnetic sensor 33b, each of the first and second focus mechanisms 15 and 18 is likely to be affected by magnetic fields generated from the VCMs 52 and 53 of the adjacent vibration-proof mechanism 17 and the position sensors 54 and 55 that use Hall elements as the magnetic sensors 54b and 55b. For this reason, in a state in which the position sensor 33 for focusing is viewed in the direction of the optical axis, the position sensor 33 for focusing, which uses a GMR element, is disposed at a position farthest from the VCMs 52 and 53 of the vibration-proof mechanism 17 and the position sensors 54 and 55 to suppress the occurrence of magnetic interference.

The arrangement of the respective position sensors 33, 54, and 55 and the respective VCMs 31, 52, and 53 will be described below using a first reference line BL1 and a second reference line BL2 with reference to FIG. 5. The first reference line BL1 is the extension line of a line connecting the position sensor 33 for focusing to the optical axis Ax in a state in which the position sensor 33 for focusing is viewed in the direction of the optical axis. The second reference line BL2 is a line that passes through the optical axis Ax and is orthogonal to the first reference line BL1. Two lines, which cross the first reference line BL1 and the second reference line BL2 at an angle of 45°, are a horizontal line HL parallel to the X direction and a vertical line VL parallel to the Y direction.

The focus lens frame 30 is held by the guide rods 32a and 32b as a pair of guide members 32 so as to be movable in the direction of the optical axis. The guide rods 32a and 32b are arranged on the first reference line BL1 with the optical axis Ax interposed therebetween. The coil 34 is disposed on the outer periphery of the first focus lens 22, and includes the pair of opposite long sides 34a and two pairs of short sides 34b connecting the long sides 34a and is formed in a substantially hexagonal shape. Four drive magnets 35 and four yokes 36 are arranged on the short sides 34b of the coil 34, respectively. The four drive magnets 35 and the four yokes 36 are arranged so as to be symmetric with respect to the first reference line BL1 and the second reference line BL2.

The position sensor 33 for focusing is disposed in a first region AR1 of the first region AR1 and a second region AR2 that are partitioned by the second reference line BL2. In contrast, the third drive magnets 52a, the third coil 52b, and the third yokes 52c of the X-direction VCM (third VCM) 52 of the vibration-proof mechanism 17 and the fourth drive magnets 53a, the fourth coil 53b, and the third yokes 52c of the Y-direction VCM (fourth VCM) 53 are arranged in the second region AR2 at positions that are symmetric with respect to the first reference line BL1. As described above, the respective magnets 52a and 53a and the respective coils 52b and 53b of the respective VCMs 52 and 53 of the vibration-proof mechanism 17 are spaced so as to be equidistant from the position sensor 33 for focusing in a state in which the respective magnets 52a and 53a and the respective coils 52b and 53b of the respective VCMs 52 and 53 of the vibration-proof mechanism 17 are viewed in the direction of the optical axis. Accordingly, the influence of magnetism, which is given to the position sensor 33 for focusing by the X-direction VCM 52 and the Y-direction VCM 53, can be suppressed in the first and second focus mechanisms 15 and 18. Accordingly, focusing can be accurately performed without the deterioration of the position detection accuracy of the position sensor 33 for focusing. Further, since there is no unstable operation based on the deterioration of the accuracy of the position detected by the position sensor 33 for focusing, the generation of abnormal noises and the like are suppressed.

Since the first position sensor 33 for focusing of the first focus mechanism 15 and the second position sensor 33 for focusing of the second focus mechanism 18 are arranged so as to overlap with each other as shown in FIG. 7 in a state in which the first position sensor 33 for focusing and the second position sensor 33 for focusing are viewed in the direction of the optical axis, the deviation of magnetism around the optical axis Ax, which is caused by each position sensor 33 for focusing, can be prevented. Further, since the drive magnets 52a and 53a and the coils 52b and 53b of the X-direction VCM 52 and the Y-direction VCM 53 are arranged at positions symmetric with respect to the first reference line BL1 in a state in which the drive magnets 52a and 53a and the coils 52b and 53b are viewed in the direction of the optical axis, the position sensor 33 for focusing is spaced so as to be equidistant from the X-direction VCM 52 and the Y-direction VCM 53. For this reason, the influence of the magnetism of the X-direction VCM 52 and the Y-direction VCM 53 can be suppressed so as to be more uniform.

A GMR element, which can detect magnetism weaker than magnetism to be detected by a Hall element, is used in the position sensor 33 for focusing. For this reason, the position sensor 33 for focusing can detect a focus position with high accuracy. On the other hand, the position sensor 33 for focusing is likely to be affected by the magnetism of other magnets. For this reason, the position sensor 33 for focusing is spaced from the magnets 52a and 53a and the coils 52*b* and 53*b* of the X-direction VCM 52 and the Y-direction VCM 53, so that the influence of the magnetism of the magnets 52*a* and 53*a* and the coils 52*b* and 53*b* on the position sensor 33 for focusing can be efficiently suppressed.

Further, since the position sensors 54 and 55 are arranged so as to be symmetric with respect to the first reference line BL1, the deviation of the influence of the magnetism from the first and second VCMs 31 for focusing on the position-detection magnets 54*a* and 55*a* can be prevented. Accordingly, vibration-proof performance can be improved.

Since the pair of guide members 32 is disposed for one coil 34 on the first reference line BL1 with the optical axis Ax interposed therebetween and the drive magnets 35 and the yokes 36 are arranged so as to be symmetric with respect to the first reference line BL1, the respective members, such as the coil 34, the drive magnets 35, and the yokes 36, are arranged at symmetric positions in balance. Accordingly, the VCM 31 for focusing can be smoothly operated.

Since the number of each of the drive magnets 35 (corresponding to the first and second drive magnets) and the yokes 36 (corresponding to the first and second yokes) of each of the first and second focus mechanisms 15 and 18 is four and the respective drive magnets 35 and the respective yokes 36 are arranged so as to be symmetric with respect to the second reference line BL2, the respective members are arranged in balance. For this reason, the first and second focus mechanisms 15 and 18 can be more smoothly operated. Further, since the coils 34 (corresponding to the first and second coils) of the first and second focus mechanisms 15 and 18 are formed in a hexagonal shape in a state in which the coils 34 of the first and second focus mechanisms 15 and 18 are viewed in the direction of the optical axis, the sliding portions 40 and 41 can be arranged on the pair of opposite sides and the magnets 35 and the yokes 36 can be arranged on the other two pairs of sides. Accordingly, since balanced arrangement can be made, the focus lens frame 30 can be smoothly moved.

Since the coils 34, the drive magnets 35, and the yokes 36 have the same structure in the first and second focus mechanisms 15 and 18, not only the number of types of components is reduced but also the first and second focus mechanisms 15 and 18 are easily synchronized with each other. In a case in which the moving distance of the first focus lens 22 in the direction of the optical axis and the moving distance of the second focus lens 24 in the direction of the optical axis are set to be equal to each other, the first and second focus mechanisms 15 and 18 are more easily synchronized with each other. Moreover, in a case in which the moving distance of the first focus lens 22 in the direction of the optical axis and the moving distance of the second focus lens 24 in the direction of the optical axis are set to be equal to each other and the weight of the first focus lens 22 and the weight of the second focus lens 24 are set to be equal to each other, the first and second focus mechanisms 15 and 18 are much more easily synchronized with each other.

Focus control and blur-correction are performed by the controller 8 of the camera body 12 in the embodiment. However, instead of this, a controller may be provided in the lens unit 11, and focus control and blur-correction may be performed by the controller of the lens unit 11.

In a case in which a zoom mechanism is provided, a rotatable zoom ring (not shown) is provided and one or more lenses of the first lens 21 and lens groups of the respective mechanisms, such as the first focus mechanism 15, the stop mechanism 16, the vibration-proof mechanism 17, and the second focus mechanism 18, are moved in the direction of the optical axis by an operation for rotating the zoom ring. Accordingly, a zoom operation can be performed according to an operation for rotating the zoom ring.

EXPLANATION OF REFERENCES

7: imaging element
8: controller
10: imaging apparatus
11: lens unit
12: camera body
13: connector
14: optical system
15: first focus mechanism
16: stop mechanism
16*a*: stop leaf blade
17: vibration-proof mechanism
18: second focus mechanism
19: lens barrel member
20: focus ring
21: first lens
22: first focus lens (second lens)
23: blur-correction lens (third lens)
24: second focus lens (fourth lens)
25: fifth lens
28: focus barrel
29: base plate
30: focus lens frame (first and second lens frames)
30*a*: long side
30*e*: opening
31: VCM for focusing (first and second voice coil motors)
32: guide member (first and second guide members)
32*a*, 32*b*: guide rod
33: position sensor for focusing (first and second position sensors)
33*a*: position-detection magnet (first sensor magnet)
33*b*: magnetic sensor (first magnetic sensor)
34: coil (first and second coils)
34*a*: long side
34*b*: short side
34*c*: connecting side
35: drive magnet (first and second drive magnets)
36: yoke (first and second yokes)
36*a*: outer yoke
36*b*: inner yoke
36*d*: connecting plate
40: sliding portion (guide member-sliding portion)
40*a*: sliding cylinder
41: sliding portion (guide member-sliding portion)
41*a*: sliding groove
51: blur-correction lens frame
52: X-direction VCM (third VCM)
52*a*: drive magnet (third drive magnet)
52*b*: coil (third coil)
52*c*: yoke (third yoke)
53: Y-direction VCM (fourth VCM)
53*a*: drive magnet (fourth drive magnet)
53*b*: coil (fourth coil)
53*c*: yoke (fourth yoke)
54: X-direction position sensor (third position sensor)
54*a*: position-detection magnet (second sensor magnet)
54*b*: magnetic sensor (second magnetic sensor)
55: Y-direction position sensor (fourth position sensor)
55*a*: position-detection magnet (second sensor magnet)
55*b*: magnetic sensor (second magnetic sensor)
56: fixed plate
Ax: optical axis
BL1: first reference line BL2: second reference line
HL: horizontal line
VL: vertical line
AR1: first region
AR2: second region

What is claimed is:

1. An optical device comprising:
a first lens frame that holds a first focus lens for focusing a subject image and is moved in a direction of an optical axis of the first focus lens;
a second lens frame that is disposed so as to be spaced from the first focus lens in the direction of the optical axis, holds a second focus lens for focusing the subject image, and is moved in the direction of the optical axis;
a blur-correction lens frame that holds a blur-correction lens disposed between the first focus lens and the second focus lens and is moved in a direction orthogonal to the optical axis of the first focus lens;
a first voice coil motor that includes a first drive magnet, a first yoke, and a first coil mounted on the first lens frame and moves the first lens frame in the direction of the optical axis in a case in which current flows in the first coil;
a second voice coil motor that includes a second drive magnet, a second yoke, and a second coil mounted on the second lens frame and moves the second lens frame in the direction of the optical axis in a case in which current flows in the second coil;
a third voice coil motor that includes a third drive magnet, a third yoke, and a third coil mounted on the blur-correction lens frame and moves the blur-correction lens frame in a first direction in a plane orthogonal to the optical axis in a case in which current flows in the third coil;
a fourth voice coil motor that includes a fourth drive magnet, a fourth yoke, and a fourth coil mounted on the blur-correction lens frame and moves the blur-correction lens frame in a second direction orthogonal to the first direction in a plane orthogonal to the optical axis in a case in which current flows in the fourth coil;
a first position sensor that magnetically detects a position of the first lens frame in the direction of the optical axis;
a second position sensor that magnetically detects a position of the second lens frame in the direction of the optical axis;
a third position sensor that magnetically detects a position of the blur-correction lens frame in the first direction; and
a fourth position sensor that magnetically detects a position of the blur-correction lens frame in the second direction,
wherein in a case in which a line connecting the first position sensor to the optical axis is set as a first reference line and a line orthogonal to the first reference line and passing through the optical axis is set as a second reference line in a state in which the first position sensor, the second position sensor, the third voice coil motor, and the fourth voice coil motor are viewed in the direction of the optical axis, the first position sensor and the second position sensor are arranged in a first region of the first region and a second region partitioned by the second reference line and the third drive magnet and the third yoke of the third voice coil motor and the fourth drive magnet and the fourth yoke of the fourth voice coil motor are arranged in the second region.

2. The optical device according to claim 1,
wherein the third position sensor and the fourth position sensor are arranged so as to be symmetric with respect to the first reference line.

3. The optical device according to claim 1,
wherein the first position sensor and the second position sensor are arranged so as to overlap with each other in a state in which the first position sensor and the second position sensor are viewed in the direction of the optical axis.

4. The optical device according to claim 1,
wherein the third voice coil motor and the fourth voice coil motor are arranged so as to be symmetric with respect to the first reference line in a state in which the third voice coil motor and the fourth voice coil motor are viewed in the direction of the optical axis.

5. The optical device according to claim 1,
wherein each of the first position sensor and the second position sensor includes a first sensor magnet and a first magnetic sensor that magnetically detects a change in a position of the first sensor magnet,
each of the third position sensor and the fourth position sensor includes a second sensor magnet and a second magnetic sensor that magnetically detects a change in a position of the second sensor magnet, and
the second magnetic sensor is a Hall element, and the first magnetic sensor is a magnetic sensor that detects magnetism weaker than magnetism to be detected by the Hall element.

6. The optical device according to claim 5, further comprising:
a pair of first guide members that is disposed on the first reference line with the optical axis interposed therebetween and guides the first lens frame in the direction of the optical axis; and
guide member-sliding portions which are formed on the first lens frame and on which the first guide members slide,
wherein the first coil is disposed on an outer periphery of the first focus lens, and
a plurality of the first drive magnets and a plurality of the first yokes are provided, and the plurality of first drive magnets and the plurality of first yokes are arranged so as to be symmetric with respect to the first reference line.

7. The optical device according to claim 5, further comprising:
a pair of second guide members that is disposed on the first reference line with the optical axis interposed therebetween and guides the second lens frame in the direction of the optical axis; and
guide member-sliding portions which are formed on the second lens frame and on which the second guide members slide,
wherein the second coil is disposed on an outer periphery of the second focus lens, and
a plurality of the second drive magnets and a plurality of the second yokes are provided, and the plurality of second drive magnets and the plurality of second yokes are arranged so as to be symmetric with respect to the first reference line.

8. The optical device according to claim 7,
wherein a number of each of the first drive magnets, the first yokes, the second drive magnets, and the second yokes is four, and the respective magnets and the respective yokes are arranged so as to be symmetric with respect to the second reference line.

9. The optical device according to claim 8,
wherein the first coil and the second coil are formed in a hexagonal shape in a state in which the first coil and the second coil are viewed in the direction of the optical axis.

10. The optical device according to claim 9,
wherein the first and second drive magnets of the first and second voice coil motors have a same shape, the first and second yokes of the first and second voice coil motors have a same shape, and the first and second coils of the first and second voice coil motors have a same shape.

11. The optical device according to claim 10,
wherein a moving distance of the first focus lens in the direction of the optical axis is equal to a moving distance of the second focus lens in the direction of the optical axis.

12. The optical device according to claim 10,
wherein the moving distance of the first focus lens in the direction of the optical axis is equal to the moving distance of the second focus lens in the direction of the optical axis, and a weight of the first focus lens is equal to a weight of the second focus lens.

13. An imaging apparatus comprising:
the optical device according to claim 1; and
an imaging element that takes the subject image to be obtained through the optical device.

14. The imaging apparatus according to claim 13,
wherein the optical device is included in an exchangeable lens unit including a connector that is attachable to and detachable from a camera body including the imaging element.

\* \* \* \* \*